(12) United States Patent
Frenier et al.

(10) Patent No.: US 6,399,547 B1
(45) Date of Patent: Jun. 4, 2002

(54) WELL TREATMENT FLUIDS COMPRISING MIXED ALDEHYDES

(75) Inventors: Wayne W. Frenier, Katy; Donald G. Hill, Sugar Land, both of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/512,495

(22) Filed: Feb. 24, 2000

Related U.S. Application Data

(62) Division of application No. 09/417,426, filed on Oct. 13, 1999, now Pat. No. 6,068,056.

(51) Int. Cl.[7] .............................................. C09K 3/00
(52) U.S. Cl. ..................... 507/268; 507/939; 252/396
(58) Field of Search .................... 507/268, 939; 252/396

(56) References Cited

U.S. PATENT DOCUMENTS

| | | | | | |
|---|---|---|---|---|---|
| 2,426,318 A | * | 8/1947 | Menual | ...................... | 507/268 |
| 2,496,594 A | * | 2/1950 | Moyer | ...................... | 507/268 |
| 2,605,223 A | * | 7/1952 | Case | ...................... | 507/268 |
| 2,882,226 A | * | 4/1959 | Snider | ...................... | 507/268 |
| 3,453,203 A | * | 7/1969 | Foroulis | ...................... | 507/268 |
| 3,530,059 A | * | 9/1970 | Foroulis | ...................... | 507/268 |
| 3,537,974 A | * | 11/1970 | Foroulis | ...................... | 507/268 |
| 4,191,657 A | | 3/1980 | Swanson | ................... | 252/8.55 |
| 5,366,643 A | * | 11/1994 | Walker | ...................... | 507/268 |
| 5,609,863 A | * | 3/1997 | Cox et al. | .................. | 424/766 |
| 5,807,587 A | * | 9/1998 | Cox et al. | .................. | 424/76.6 |
| 5,854,180 A | * | 12/1998 | Scherubel et al. | ......... | 507/268 |
| 6,117,634 A | | 9/2000 | Vorderbruggen et al. | ... | 252/395 |

FOREIGN PATENT DOCUMENTS

EP        489 498 A1     6/1992    ........... E21B/43/27

* cited by examiner

*Primary Examiner*—Philip Tucker
(74) *Attorney, Agent, or Firm*—Robin C. Nava; Stephen F. Schlather; Thomas O. Mitchell

(57) ABSTRACT

An acidic fluid that is useful in stimulation and workover operations, and in particular, in matrix acidizing treatments, comprises an acid, such as hydrochloric acid; water; an aliphatic aldehyde having 1–10 carbon atoms; and an aromatic aldehyde having 7–20 carbon atoms. The aliphatic aldehyde preferably has 1–6 carbon atoms. Glyoxylic acid and glyoxal are especially preferred aliphatic aldehydes. The aromatic aldehyde preferably has 7–10 carbon atoms. Cinnamaldehyde is especially preferred.

28 Claims, No Drawings

WELL TREATMENT FLUIDS COMPRISING MIXED ALDEHYDES

This is a division of application Ser. No. 09/417,426 filed Oct. 13, 1999 now U.S. Pat. No. 6,068,056.

TECHNICAL FIELD OF THE INVENTION

This Invention relates to the stimulation of hydrocarbon wells and in particular to acid fluids and methods of using such fluids in treating a subterranean formation having low permeability.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. Hydrocarbon producers perform stimulation techniques to increase the net permeability of the reservoir. Stimulation techniques include: (1) injecting chemicals into the wellbore to react with and dissolve the damage (e.g., wellbore scaling); (2) injecting chemicals through the wellbore and into the formation to react with and dissolve small portions of the formation to create alternative flowpaths for the hydrocarbon (thus rather than removing the damage, redirecting the migrating oil around the damage); or (3) injecting chemicals through the wellbore and into the formation at pressures sufficient to actually fracture the formation, thereby creating a large flow channel though which hydrocarbon can more readily move from the formation and into the wellbore. The present Invention is directed primarily to the first and second of these three processes, although it can also be applied in the third process.

Thus, the present Invention relates to methods to enhance the productivity of hydrocarbon wells (e.g., oil and gas wells) by creating alternate flowpaths by dissolving small portions of the formation, or by removing (by dissolution) near-wellbore formation damage and scaling. Generally speaking, acids or acid-based fluids are useful for this purpose due to their ability to dissolve both formation minerals and contaminants (e.g., drilling fluid coating the wellbore or that has penetrated the formation) which were introduced into the wellbore/formation during drilling or remedial operations. The most common agents used in acid treatment of wells are mineral acids such as hydrochloric (HCl) and/or hydrofluoric (HF) acid.

At present, acid treatments are plagued by three serious limitations: (1) radial penetration; (2) axial distribution; and (3) corrosion of the pumping and well bore tubing. Limitations on radial penetration are caused by the fact that as soon as the acid, particularly mineral acid, is introduced into the formation or wellbore it reacts very quickly with the formation matrix and/or the wellbore scaling. Generally, the dissolution is so rapid that the injected acid is essentially spent by the time it reaches a few inches beyond the wellbore. Organic acids (e.g., formic acid, acetic acid) are sometimes used to address limitations on radial penetration since organic acids react more slowly than mineral acids. Sometimes, retarded acid systems, which use techniques such as gelling the acid, oil-wetting the formation, or emulsifying the acid with an oil, are used. Each alternative, however, has associated drawbacks and is an imperfect solution to limited radial penetration.

The second limitation of acid treatments, axial distribution, refers to the general desirability to limit the movement of the acid solution axially, so that it does not intrude upon other zones in the subterranean formation, in particular, water-saturated zones. Conventional mineral acid treatment (e.g., HCl) has very high miscibility and the potential for undesirable migration of the HCl-based fluid into a water-saturated zone is a concern. Low miscibility acid fluids are desirable to minimize fluid migration away from its intended target (i.e., the desired hydrocarbon flowpath, or the damaged region).

Another ubiquitous problem with acid treatments is the corrosion of the pumping equipment and well tubings and casings, caused by contact with the acid (worse in the case of more concentrated solutions of mineral acids). Conventional acid treatments require the addition of a corrosion inhibitor; however, this can significantly increase the cost of a matrix acidizing treatment.

A related problem associated with acid treatments is iron precipitation, especially in sour wells (i.e., wells in which the oil has a relatively high sulfur content). Iron sulfide scale tends to form in boreholes, tubulars, and/or formations, especially in sour wells. The acid used to treat the well can dissolve the iron sulfide, but in the process hydrogen sulfide is generated. $H_2S$ is toxic and stimulates corrosion. In addition, the dissolved iron will tend to precipitate, in the form of ferric hydroxide or ferrous sulfide, as the acid in the treatment fluid becomes spent (i.e., fully reacted) and the pH of the fluid increases. Such precipitation of iron is highly undesirable because of the damage it can do to the permeability of the formation. Therefore, acid treatment fluids often contain additives to minimize iron precipitation and $H_2S$ evolution, for example by sequestering the Fe ions in solution, or by reducing ferric ions to the more soluble ferrous form of iron.

U.S. Pat. No. 4,220,550, Composition and Method for Removing Sulfide-Containing Scale from Metal Surfaces, suggests the use of an aldehyde dispersed in acid to prevent the evolution of $H_2S$ when removing sulfide-containing scale from metal surfaces. Examples of aldehydes disclosed as being suitable for this use include formaldehyde, acetaldehyde, and glyoxal. Unfortunately, formaldehyde has been listed as a suspected carcinogen. In addition, formaldehyde can react with HCl to form chloromethyl ethers which are known human carcinogens. Glyoxal has been used as a replacement for formaldehyde, but it is relatively expensive.

U.S. Pat. No. 4,289,639, Method and Composition for Removing Sulfide-Containing Scale from Metal Surfaces, discloses aqueous cleaning compositions for removing sulfide-containing scale from metal surfaces. The cleaning composition includes a nonoxidizing acid, such as HCl, and glyoxylic acid. The latter component is present in an amount sufficient to substantially prevent evolution of $H_2S$.

U.S. Pat. No. 4,734,259, Mixtures of $\alpha,\beta$-Unsaturated Aldehydes and Surface Active Agents Used as Corrosion Inhibitors in Aqueous Fluids, suggests that in acidizing well treatments, corrosion can be inhibited by including $\alpha,\beta$-unsaturated aldehydes and a surfactant in the acid treatment fluid. Examples of $\alpha,\beta$-unsaturated aldehydes disclosed as being useful for this purpose include cinnamaldehyde and certain derivatives thereof.

U.S. Pat. No. 4,888,121, Compositions and Method for Controlling Precipitation When Acidizing Sour Wells, discloses an acidizing composition that includes an acid such as HCl; an iron sequestering agent such as citric acid, ethylenediaminetetraacetic acid (EDTA), or nitrilotriacetic acid (NTA); and a sulfide modifier such as formaldehyde. This composition is stated to inhibit precipitation of ferric hydroxide, ferrous sulfide, and free sulfur, during the well acidizing treatment.

Although the above treatment fluids can help control iron precipitation, in some situations effective control would require the use of so much material that the treatment cost would become excessive. This would be especially true in wells with very heavy FeS deposits.

As evidenced by the references cited above, numerous techniques have been proposed to control acid corrosion and control the ferrous sulfide dissolution, but each is an imperfect solution at best. Therefore, an improved acid well treatment fluid that is relatively inexpensive, has low corrosivity and effectively dissolves FeS without significant liberation of $H_2S$ is a long-sought after and highly desirable goal.

SUMMARY OF THE INVENTION

In a general sense, the present Invention relates to the use of acidic fluids in stimulation and workover operations, and in particular, in matrix acidizing treatments. One embodiment of the Invention is a well treatment fluid composition that comprises: (a) an acid; (b) water; (c) an aliphatic aldehyde having 1–10 carbon atoms; and (d) an aromatic aldehyde having 7–20 carbon atoms. The aliphatic aldehyde preferably has 1–6 carbon atoms. Glyoxylic acid, glyoxal, and mixtures of the two are especially preferred aliphatic aldehydes for use in the present Invention. The aromatic aldehyde preferably has 7–10 carbon atoms, with cinnamaldehyde being an especially preferred example. Optionally the aromatic aldehyde can be a substituted cinnamaldehyde. In one particularly preferred embodiment, the aromatic aldehyde is primarily t-cinnamaldehyde.

The acid used in the compositions of the present Invention can be, for example, a non-oxidizing mineral acid, such as hydrochloric acid, hydrofluoric acid, or a mixture thereof. Alternatively, the acid can be a non-oxidizing organic acid, such as formic acid, acetic acid, or a mixture thereof. Compositions of the present Invention can optionally further comprise one or more additives selected from the group consisting of surfactants, corrosion inhibitors, stabilizers, sequestering agents, viscosity modifying agents, and pH control agents.

Another aspect of the present Invention is a corrosion inhibitor composition that comprises an aliphatic aldehyde having 1–10 carbon atoms and an aromatic aldehyde having 7–20 carbon atoms, as described above. This corrosion inhibitor composition, which optionally can also include other additives, can be combined with an aqueous acid solution to form a well treatment fluid.

Another aspect of the present Invention is a method of acid-treating a subterranean formation. The method includes the step of injecting a well treatment fluid composition via a wellbore into a subterranean formation. The well treatment fluid composition comprises the components described above. Although the injection step is preferably performed at a fluid pressure that is less than the minimum in situ rock stress (i.e., a matrix acidizing method), the method can also be performed at a higher pressure (i.e., an acid fracturing method). The method can also be used to remove deposits from the wellbore.

The compositions and methods of the present Invention provide several substantial advantages over prior stimulation and workover fluids and methods. The present Invention has a relatively low corrosivity, especially in the presence of $H_2S$. Therefore, the pumps, storage tanks, well casings, and so forth-which are extraordinarily expensive to replace—are not substantially damaged due to corrosion caused by acid, as they are in conventional acid treatments. Without being bound by theory, it is believed that the composition of the present invention absorbs $H_2S$ and protects metal surfaces from acid by forming a protective coating thereon. The composition of the present invention also allows more efficient removal of FeS with minimal to no film formation.

Another advantage of the present invention is its relatively low cost, due to the relatively inexpensive nature of the mixed aldehydes as compared to other corrosion inhibitors that have been used or proposed.

DETAILED DESCRIPTION OF PREFERRED EMBODIMENTS

Components of the Well Treatment Fluid

The acids that can be used in the compositions and methods of the present Invention are those that are well-known in the art. Examples include non-oxidizing mineral acids such as hydrochloric acid, sulfuric acid, phosphoric acid, hydrofluoric acid, and mixtures thereof. Other examples include non-oxidizing organic acids such as formic acid, acetic acid, citric, and mixtures thereof. These acids will typically be used as an aqueous solution, which may be foamed, or as an acid and oil emulsion.

Compositions of the present invention also include a mixture of at least two aldehydes from selected groups. The first group of aldehydes is aliphatic aldehydes that have 1–10 carbon atoms, preferably 1–6 carbon atoms. Glyoxylic acid, glyoxal, and mixtures thereof are especially preferred as the aliphatic aldehyde component. Formaldehyde is another suitable example.

The second group of aldehydes is aromatic aldehydes that have 7–20 carbon atoms, preferably 7–10 carbon atoms. Cinnamaldehyde and its derivatives are especially preferred aromatic aldehydes in the present Invention. It is especially preferred to employ an aromatic aldehyde compound or mixture that is primarily t-cinnamaldehyde. "Primarily" in this context means that if a mixture of aromatic aldehydes is present (including mixtures of isomers), t-cinnamaldehyde makes up more than about 50% by weight of that mixture.

It should be understood that more than two aldehydes can be used in compositions of the present Invention. For instance, two or more aliphatic aldehydes as defined above can be used, and/or two or more aromatic aldehydes. Other aldehydes not falling within the above definitions in terms of number of carbon atoms or otherwise could also be included. However the composition must include at least one aliphatic aldehyde and at least one aromatic aldehyde as defined above.

Cinnamaldehydes used in the present invention can be substituted or unsubstituted. Examples of substituted cinnamaldehydes that could be used in the present Invention include:

dicinnamaldehyde
p-hydroxycinnamaldehyde
p-methylcinnamaldehyde
p-ethylcinnamaldehyde
p-methoxycinnamaldehyde
p-dimethylaminocinnamaldehyde
p-diethylaminocinnamaldehyde
p-nitrocinnamaldehyde
o-nitrocinnamaldehyde
4-(3-propenal)cinnamaldehyde
p-sodium sulfocinnamaldehyde
p-trimethylammoniumcinnamaldehyde sulfate p-trimethylammoniumcinnamaldehyde o-methylsulfate
p-thiocyanocinnamaldehyde
p-(S-acetyl)thiocinnamaldehyde
p-(S-N,N-dimethylcarbamoylthio)cinnamaldehyde
p-chlorocinnamaldehyde
α-methylcinnamaldehyde
β-methylcinnamaldehyde
α-chlorocinnamaldehyde
α-bromocinnamaldehyde
α-butylcinnamaldehyde
α-amylcinnamaldehyde
α-hexylcinnamaldehyde
α-bromo-p-cyanocinnamaldehyde
α-ethyl-p-methylcinnamaldehyde
p-methyl-α-pentylcinnamaldehyde The composition can also include one or more additives that are compatible with the acid composition, such as surfactants, corrosion inhibitors (such as the alkylphenones described in U.S. Pat. Nos. 5,013,483 and 5,096,618), stabilizers, solvents, iron reducing agents, sequestering agents (such as NTA, EDTA, HEDTA, or citric acid), viscosity modifying agents, and pH control agents. Many such additives are well known in the art. Corrosion inhibitors in particular should be selected with reference to the particular acid used in the composition. Some specific presently preferred additives for use in compositions of the present Invention are HCl acid corrosion inhibitors, iron control additives, e.g. EDTA, nonionic or cationic surfactants and inhibitor intensifiers (such as formic acid) In certain instances, it may be desirable to gel, or increase the viscosity of the treatment fluid, such that it will form a viscous gel upon contact with water. Viscoelastic surfactants ("VES") can be used as gelling agents. Preferred viscoelastic surfactants are disclosed in the following patents and patent applications, which are incorporated by reference in their entirety. U.S. Pat. No. 5,258,137, Viscoelastic Surfactant Based Foam Fluids; U.S. Pat. No. 5,551,516, Hydraulic Fracturing Process and Compositions; U.S. patent application Ser. No. 08/727,877, Methods of Fracturing Subterranean Formations, filed Oct. 9, 1996; U.S. patent application Ser. No. 08/865,137, Methods for Limiting the Inflow of Formation Water and for Stimulating Subterranean Formations, filed May 29, 1997; U.S. patent application Ser. No. 09/166,658, Methods of Fracturing Subterranean Formations, filed October 5, 1998.

The proportion of the various components of a composition of the present Invention will vary depending on the characteristics of the formation to be treated, the acid to be used, and other factors well known in the art. Typical concentration ranges for an aqueous HCl composition of the present invention are as follows (percentages are by weight):

| HCl | 3–28% |
|---|---|
| glyoxylic acid or glyoxal | 0.5–10% |
| t-cinnamaldehyde | 0.1–1% |
| other additives | 0.1–10% |
| water | balance % |

The weight ratio of the aliphatic aldehyde (such as glyoxylic acid or glyoxal) to the aromatic aldehyde (such as cinnamaldehyde) preferably is from about 2:1 to about 25:1. In one specific embodiment of the invention, glyoxylic acid and cinnamaldehyde are present in a weight ratio of about: 10:1.

The mixture of aldehydes can be combined with acid, water, and any other additives in a mixing tank above ground and then injected into the well and the target formation. Alternatively, the mixed aldehydes, with or without other additives, can be mixed as a corrosion control composition, which can be stored by itself, and mixed with the acid solution at the desired time and place.

The corrosion protection provided by the present invention is effective at temperatures of at least 275° F.

Specific Types of Formations and Damage Treated

The efficiency of a matrix treatment depends primarily upon removing or bypassing regions of low permeability that restrict productivity. This restriction is generally shown by an overall diminished production level or a sharper-than-expected decline in production. Pressure transient analysis is a common technique for estimating the extent of damage.

The physical characteristics, not the origin of the damage, determine the selection of the proper treating fluid. Therefore, one fluid that is effective on one type of damage will generally be effective, regardless of the cause of the damage. The sources of formation damage are: drilling, cementing, completion, gravel packing, production, stimulation, and injection. At least eight basic types of damage are known to occur. These are: emulsion, wettability change, water block, scales (inorganic deposits), organic deposits, mixed deposits, silts and clays, and bacteria. A preferred conventional technique to treat emulsion-based damage is to break/destabilize the emulsion.

Scales are precipitated mineral deposits, and can form when incompatible waters combine, e.g., formation water and either a fluid filtrate or injection water. The most common type of scale is carbonate scales: $CaCO_3$, and $FeCO_3$, of which the former is by far the most common. The conventional treatment for carbonate scales is HCl. Therefore, the fluids and methods of the present Invention are readily operable on carbonate scales. Other types of scales particularly treatable by the fluids and techniques of the present Invention include chloride scales (e.g., NaCl), iron scales (e.g., FeS, $Fe_2O_3$), silica scales (e.g., $SiO_2$), and hydroxide scales (e.g., $Mg(OH)_2$). In certain instance—e.g., iron scales—the skilled engineer may wish to formulate a fluid of the present Invention that additionally comprises a reducing agent, or sequestrant (e.g., EDTA). In the case of silica scales, a fluid of the present Invention preferably should be prepared using HF.

In conventional acid treatments (e.g., HCl), formation of asphaltene, paraffin and sludge (i.e., organic deposits produced from inorganic acids and crude oil) is a persistent and costly problem. This is particularly true since sludges cannot be dissolved; therefore the best way to control them is to prevent their formation. Hence, additives are often included in conventional acid fluids to present the formation of these substances. These additives are generally organic solvents (e.g., xylene, polar surfactants such as dodecylbenzyl sulfonic acid).

The fluids of the present Invention can also be used to remove mixed deposits—i.e., blends of organic compounds and either scales of silts or clays.

Silts and clay damage are readily treated with the fluids of the present Invention. Conventional treatment fluids are HCl-based systems. In sandstone formations, HF is often combined with HCl. Similarly, HF can be added to the fluids of the present Invention.

Another type of formation/wellbore damage is caused by bacteria, including sulfate-reducing bacteria, iron (manganese) bacteria, and slime formers. These cause the formation of sulfide scales (FeS). Fluids of the present Invention are effective in treating damage due to bacteria.

Matrix Acidizing Treatment

The well treatment fluid compositions of the present invention can be used in matrix acidizing of subterranean formations surrounding wellbores. Such matrix acidizing methods generally involve pumping the acid-containing well treatment composition down the wellbore and out through perforations into the target formation. Packers can be used in the wellbore to control the formation zones into which the treatment fluid is injected from the wellbore, if the well has perforations in more than one zone. After the composition has been injected into the formation, optionally the well can be shut in for a period of time to allow more complete reaction between the acid and the formation material. The desired result of the treatment is an increase in the permeability of the formation, for example by the creation or enlargement of passageways through the formation, and therefore an increase in the rate of production of formation fluids such as oil and gas.

Parameters such as pumping rate, pumping time, shut-in time, acid content, and additive package, must be determined for each particular treatment since each of these parameters depends upon the extent of the damage, formation geology (e.g., permeability), formation temperature, depth of the producing zone, etc. A well-treatment designer of ordinary skill is familiar with the essential features of matrix acidizing treatments. For discussions of varying levels of generality, the skilled designer is referred to the following U.S. Patents: U.S. Pat. No. 5,203,413, Product and Process for Acid Diversion in the Treatment of Subterranean Formations; U.S. Pat. No. 4,574,050, Method for Preventing the Precipitation of Ferric Compounds During the Acid Treatment of Wells; U.S. Pat. No. 4,695,389, Aqueous Gelling and/or Foaming Agents for Aqueous Acids and Methods of Using the Same; U.S. Pat. No. 4,448,708, Use of Quaternized Polyamidoamines as Demulsifiers; U.S. Pat. No. 4,430,128, Aqueous Acid Compositions and Method of Use; U.S. Pat. No. 3,122,203, Well Washing Process and Composition; U.S. Pat. No. 2,011,579, Intensified Hydrochloric Acid; U.S. Pat. No. 2,094,479, Treatment of Wells, assigned to William E. Spee, 1937; and U.S. Pat. No. 1,877,504, Treatment of Deep Wells. These United States Patents are hereby incorporated by reference in their entirety.

In addition, the skilled designer is directed to the following articles taken from a benchmark treatise in the field of matrix acidizing, and familiar to the skilled designer: M. Economides, *Reservoir Justification of Stimulation Techniques*, In *Reservoir Stimulation*, M. Economides and K. G. Nolte, eds. 1-01 (1987); Bernard Piot and Oliver Lietard, *Nature of Formation Damage*, M. Economides and K. G. Nolte, eds. 12-01 (1987); Laurent Prouvost and Michael Economides, *Matrix Acidizing Treatment Evaluation*, M. Economides and K. G. Nolte, eds. 16-01 (1987).

The prior art references cited above indicate the level of skill in the art, and establish that the techniques necessary to use a composition of the present invention (e.g., in a typical matrix-treatment protocol) are known in the art.

Other Stimulation and Workover Treatments

Throughout this document, the focus has been upon matrix acidizing; nevertheless, the skilled treatment designer will immediately recognize that the teaching presented in this disclosure is not limited to matrix acidizing treatments, but rather can be incorporated into several other related stimulation techniques. First, by increasing the pumping pressure, a matrix acidizing treatment become an acid fracturing treatment. Second, although the above disclosure is primarily directed to damage in the formation, the fluids of the present Invention could also be directed to removal of damage in the wellbore itself (which is often more formally referred to as a workover or completion technique rather than a stimulation technique) in either cased or open hole, e.g., to unplug perforations, or to remove filter cake and scale prior to cementing. More particularly, damage coating a wellbore is often comprised of the same components as damage to the formation (to which matrix acidizing treatments are directed). Frequently FeS is found in production tubing. In addition, as indicated in the proceeding disclosure, the fluids of present Invention can be gelled (e.g., with VES or polyacrylamide copolymers), emulsified with oils, or foamed. The fluids described in this invention can be used to form an emulsion by addition of suitable hydrocarbon and emulsifying agents. Also the fluids described in this invention can foamed by addition of suitable gases (e.g. air, nitrogen, or carbon dioxide).

The present invention can be further understood from the following examples.

EXAMPLE 1

All tests were run in three neck reaction flask equipped with a dropping funnel, heating mantle/temperature controller and a mechanical stirrer. The dropping funnel was used for efficient addition of all acid solutions containing all additives. The dropping funnel could be replaced with a powder funnel for direct addition of the FeS. The mechanical stirrer was used for efficient mixing of the acid with the powdered iron sulfide. 108 g of 7.5% HCl was heated to 150° F. in a flask with a stirrer and a vent to a bottle filled with 3% NaOH (caustic scrubber). This scrubber was designed to trap any $H_2S$ evolved during the reaction of FeS and HCl. Various chemicals were present in the acid as speciﬁed. When the flask reached the test temperature, 10 g of FeS was added. This amount is enough to completely spend the acid. Glyoxal was used as a 40% aqueous solution and Glyoxylic acid was used as a 50% aqueous solution. Cinnamaldehyde was used as a 67.5% solution in isopropanol solvent with a nonionic surfactant. (All percentages and ratios herein are by weight unless otherwise stated.) Other additives used were as follows (Table 1). The results are seen in Table 2.

TABLE 1

| Additive | Description |
|---|---|
| Corrosion Inhibitor 1 | Alkylphenone as described in U.S. Pat. No. 5,013,483, formulated with acetylenic alcohols and nonionic surfactants. |
| Corrosion Inhibitor 2 | Quaternary aromatic amine formulated with nonionic surfactants, acetylenic alcohols and aromatic solvents. |
| Surfactant 3 | Mixture of amphoteric and nonionic surfactants and solvents. |
| Iron Control 4 | Nitrilotriacetic acid. |
| Hexamethylenetetramine | This material yields formaldehyde on addition to HCl. |
| Formaldehyde | A known $H_2S$ scavenger. |

TABLE 2

Dissolution of 10 g FeS in 108 g 7.5% HCl, 150° F.

| Add1 | Add2 | [Fe] ICP % | FeS dis. G | % diss | [S] in acid % | [S] in NaOH % |
|---|---|---|---|---|---|---|
| Control | | 4.61 | 9.45 | 94.51 | 0.311 | 0.508 |
| 16 g Glyoxal | | 3.505 | 7.19 | 71.85 | 1.320 | 0.005 |
| 16 g Glyoxal | 1 g cinnamaldehyde | 1.65 | 3.38 | 33.83 | 0.709 | 0.001 |
| 16 g Glyoxylic acid | | 3.81 | 7.79 | 77.90 | 1.287 | 0.001 |
| 5 g hexamethylenetriamine | | 1.725 | 3.18 | 31.80 | 0.900 | 0.020 |
| 2 g cinnamaldehyde | | 0.5 | 1.00 | 10.00 | 0.308 | 0.001 |
| 9 g 37% formaldehyde | | 2.8 | 5.74 | 57.40 | 0.241 | 0.134 |

The control (no additives) dissolved almost 95% of the FeS, but evolved a large amount of $H_2S$ and there was only as much sulfur in the acid (about 0.3%) as the acid can hold at equilibrium. All of the control additives reduced the amount of $H_2S$ that reached the NaOH, but all of them also reduced the amount of FeS that was dissolved. The materials that reduced the FeS dissolution the least amount (but still controlled the $H_2S$) were glyoxal and glyoxylic acid. Cinnamaldehyde (at 2 g) significantly reduced the FeS dissolution when used as the only control additive. However, when used at a lower amount (1g) with glyoxal, the reduction in FeS dissolution was not so significant.

EXAMPLE 2.

The previous case is more extreme than is usually found in field applications (i.e., the acid was spent totally by the FeS). A more realistic case is described next. Three g of FeS was dissolved for four hours in 200 ml of 7.5% HCl at 150° F. in the presence of various additives. Glyoxal was used as a 40% aqueous solution and Glyoxylic acid was used as a 50% aqueous solution. Cinnamaldehyde was used as a 67.5% solution in isopropanol solvent with a nonionic surfactant. (All percentages and ratios herein are by weight unless otherwise stated.) The results are seen in Table 3.

TABLE 3

| Glyoxal or glyoxylic acid | Cinnamaldehyde | Other additive | [Fe] conc. In acid (%) | g FeS Dissolved | Equiv. FeS dissolved (% theor) | [S] conc. in acid (%) | [S] conc. in NaOH (%) |
|---|---|---|---|---|---|---|---|
| 6 g glyoxal | | | 1.1 | 3.64 | 100 | 0.54 | 0.001 |
| 6 g glyoxal | | 0.4 ml additive 1 | 0.99 | 3.28 | 100 | 0.54 | 0.001 |
| 6 g glyoxylic acid | | | 1.23 | 3.70 | 100 | 0.56 | 0.001 |
| 6 g glyoxylic acid | | 0.4 ml additive 1 | 1.2 | 3.68 | 100 | 0.56 | 0.001 |
| 5.5 g glyoxal | 0.5 g | 0.4 ml additive 2; 1.0 ml additive 3; 1.0 g additive 4 | 0.8 | 2.65 | 88 | 0.47 | 0.001 |
| 5.5 g glyoxylic acid | 0.5 g | 0.4 ml additive 2; 1.0 ml additive 3; 1.0 g additive 4 | 1.0 | 3.31 | 100 | 0.54 | 0.001 |
| 5.5 g glyoxylic acid | | 0.4 ml additive 2; 1.0 ml additive 3; 1.0 g additive 4 | 0.75 | 2.48 | 83 | 0.55 | 0.001 |

These data demonstrate that the combination of the aliphatic aldehyde and the aromatic aldehyde gives excellent dissolution of FeS (>80% in all cases) and still suppressed evolution of H$_2$S (very little sulfur in the NaOH trap), while holding the sulfur in the acid.

These data demonstrate that the combination of the aliphatic aldehyde and the aromatic aldehyde gives excellent dissolution of FeS (>80% in all cases) and still suppressed evolution of H$_2$S (very little sulfur in the NaOH trap), while holding the sulfur in the acid.

In some cases a corrosion coupon of L80 steel was added for the duration of the four-hour test. Results of the corrosion evaluation at 150° F. are shown in Table 4. As noted above, the addition of cinnamadehyde significantly reduced the corrosion rate in the presence of glyoxylic acid.

TABLE 4

| Glyoxal or glyoxylic acid | Cinnamaldehyde | Other additives | Pitting index*** | corrosion rate (lb/ft$^2$) |
|---|---|---|---|---|
| 6 g glyoxal | — | 0.2% additive 2 | 0 | 0.001 |
| 6 g glyoxylic acid | — | 0.2% additive 2 | 0 | 0.007 |
| 5.5 g glyoxal | 0.5 g | 0.2% additive 2; 0.5% additive 3; 1.0% additive 4 | 0 | 0.001 |
| 5.5 g glyoxylic acid | 0.5 g | 0.2% additive 2; 0.5% additive 3; 1.0% additive 4 | 0 | 0.005 |
| 5.5 g glyoxylic acid | — | 0.2% additive 2; 0.5% additive 3; 1.0% additive 4 | 0 | 0.010 |

***A pitting index ≤ 3 is acceptable.

EXAMPLE 3

Corrosion tests were completed with L80 steel exposed to 7.5% inhibited with Acid Corrosion Inhibitor 2 and Inhibitor Intensifier 5. Tests were completed at 275° F. and 5,000 psi for four hours contact time at temperature. FeS was dissolved in 7.5% HCl (FeS/HCl weight ratio 1.2:100) in the presence of various additives. Glyoxal was used as a 40% aqueous solution and Glyoxylic acid was used as a 50% aqueous solution. Cinnamaldehyde was used as a 67.5% solution in isopropanol solvent with a nonionic surfactant. Corrosion data is shown for glyoxylic acid and glyoxal in combination with cinnamaldehyde at a 10:1 ratio. Other acidizing additives are also present, such as surfactants and iron control additives, as shown in Table 5.

TABLE 5

| Additive | Description |
|---|---|
| Corrosion Inhibitor 2 | Quaternary aromatic amine formulated with nonionic surfactants, acetylenic alcohols and aromatic solvents. |
| Surfactant 3 | Mixture of amphoteric and nonionic surfactants and solvents. |
| Iron Control Additive 4 | Nitrilotriacetic acid. |
| Inhibitor Intensifier 5 | Formic acid. |
| Surfactant 6 | Mixture of cationic and amphoteric surfactants. |
| Surfactant 7 | Synergistic blend of nonionic surfactants. |

Test coupons measured approximately 25 cm$^2$ and were obtained from a section of L80 tubing oilfield tubing. The mill scale was removed from the surface of the coupon. All coupons were cleaned, rinsed in acetone, dried and weighed before use. Coupons were stored in a desicator until use. Results of the corrosion tests are shown in Table 6. As shown, the addition of Cinnamaldehyde is dramatically effective in minimizing the corrosion in the presence of FeS dissolution when glyoxalic acid and glyoxal are also used. The desirable corrosion rate recommended for these test conditions is 0.05 lb/ft$^2$ with no unacceptable pitting.

TABLE 6

All Tests contain 1.0% or 0.6% Corrosion Inhibitor 2 (as specified); 2.0% Inhibitor Intensifier 5 and 35 ppt Iron Control Additive 4

| Glyoxal or glyoxylic acid | Cinnamaldehyde | Other additives | Pitting index*** | Corrosion rate (lb/ft$^2$) |
|---|---|---|---|---|
| 2.0% glyoxal | 0.2% | 1.0% additive 2; 0.5% additive 3; | 3 | 0.019 |
| 2.0% glyoxal | 0.2% | 1.0% additive 2; 0.5% additive 7; | 2 | 0.028 |
| 2.0% glyoxal | 0.2% | 0.6% additive 2; 0.3% additive 3; | 2 | 0.009 |
| 2.0% glyoxal | — | 0.6% additive 2; 0.3% additive 3; | 1 | 0.054 |
| 2.0% glyoxylic acid | 0.2% | 1.0% additive 2; 0.5% additive 3; | 3 | 0.035 |

TABLE 6-continued

All Tests contain 1.0% or 0.6% Corrosion Inhibitor 2 (as specified); 2.0% Inhibitor Intensifier 5 and 35 ppt Iron Control Additive 4

| Glyoxal or glyoxylic acid | Cinnamaldehyde | Other additives | Pitting index*** | Corrosion rate (lb/ft$^2$) |
|---|---|---|---|---|
| 2.0% glyoxylic acid | 0.2% | 0.6% additive 2; 0.3% additive 3; | 2 | 0.028 |
| 2.0% glyoxylic acid | — | 0.6% additive 2; 0.3% additive 3 | 1 | 0.083 | ppt = pounds of additive per thousand gallons of acid solution
***A pitting index ≦ 3 is acceptable.

At the conclusion of the corrosion tests completed at 275° F. and 5,000 psi, select samples were submitted for total iron and sulfur analyses in the acid solution to determine % dissolution of FeS. Results of these analyses are shown in Tables 7 for glyoxylic acid and glyoxal with varied surfactants. Results show high FeS dissolution. These results clearly show that greater than 80% dissolution of the FeS is observed with the use of glyoxylic acid or glyoxal. The iron and sulfur analyses are frequently observed to be higher than 100%, based on the quantity of FeS added to the test. These observations are attributed to the high temperature test and some of the water may have evaporated during the test and ions may have been concentrated, resulting in values greater than 100%. Note that high iron and sulfur content is desirable for this test procedure. A high iron content signifies high FeS dissolution. On the other hand, high sulfur indicate good scavenging of the glyoxylic acid or glyoxal product. This is a direct analysis of the acid following the corrosion test and illustrates the high solubility of the scavenged sulfur products. No NaOH solution was used for capturing the liberated $H_2S$ because this was a high-pressure test and capturing the $H_2S$ was not feasible for this operation. One conclusion is clear: glyoxylic acid and glyoxal are both effective in controlling $H_2S$ and high solubility is achieved for these test conditions.

TABLE 7

All Tests contain 1.0% Corrosion Inhibitor 2; 2.0% Inhibitor Intensifier 5 and 35 ppt Iron Control Additive 4

| Additives | | | Iron Analyses | | | | Sulfur Analysis | | |
|---|---|---|---|---|---|---|---|---|---|
| Glyoxal or gluoxylic acid | Cinnamal-dehyde | Other additives | Total [Fe] in acid solution | [Fe] due corrosion | Equiv. FeS dissolved* | | Total [S] in acid solution | Equiv. FeS dissolved** | |
| | | | ppm | g Fe | (g Fe) | g Fes | % theor. | (% S) | g FeS | d% FeS |
| 2.0 % glyoxylic acid | 0.2% | 0.5% Surfactant 3; | 9,600 | 1.51 | 0.438 | 1.07 | 89.4 | 0.426 | 1.168 | 108.9 |
| 2.0% glyoxylic acid | 0.2% | 0.3% Surfactant 6; | 13,100 | 2.06 | 0.724 | 1.34 | 111.5 | 0.381 | 1.045 | 78.1 |
| 2.0% glyoxylic acid | 0.2% | 0.3% Surfactant 3; | 8,700 | 1.37 | 0.379 | 0.99 | 82.6 | 0.398 | 1.091 | 110.1 |
| 2.0% glyoxal | 0.2% | 0.3% surfactant 6; | 13,940 | 2.19 | 0.861 | 1.33 | 111.1 | 0.355 | 0.973 | 73.0 |
| 2.0% glyoxal | 0.2% | 0.3% Surfactant 3; | 5,590 | 0.88 | 0.207 | 0.67 | 56.1 | 0.342 | 0.938 | 139.4 |
| 2.0% glyoxylic acid | 0.2% | 0.5% Surfactant 7; | 13,080 | 2.06 | 0.666 | 1.39 | 116.0 | 0.483 | 1.324 | 95.1 | ppt = pounds of additive per thousand gallons of acid solution
*Equivalent FeS dissolved based on iron analyses.
**Equivalent FeS dissolved based on $H_2S$ generated and determined by sulfur analyses.

TABLE 8

All Tests contain 0.6% Corrosion Inhibitor 2; 2.0% Inhibitor Intensifier 5 and 35 ppt Iron Control Additive 4

| Additives | | | Iron Analyses | | | | | Sulfur Analysis | | |
|---|---|---|---|---|---|---|---|---|---|---|
| Glyoxal | | | | | | | | Total [S] | | |
| or glyoxylic acid | Cinnamal-dehyde | Other additive | Total [Fe] in acid solution | | [Fe] due corrosion | Equiv. FeS dissolved* | | in acid solution | Equiv. FeS dissolved** | |
| | | | ppm | g Fe | (g Fe) | g FeS | % theor. | (% S) | g FeS | % FeS |
| 2.0% glyoxylic acid | — | 0.3% Surfactant 3 | 16,900 | 2.66 | 1.095 | 1.57 | 130.5 | 0.498 | 1.366 | 87.2 |
| 2.0% glyoxal | — | 0.3% Surfactant 3 | 12,440 | 1.96 | 0.659 | 1.30 | 108.3 | 0.346 | 0.949 | 73.0 |
| 2.0% glyoxal | — | 0.3% Surfactant3 | 12,400 | 1.95 | 0.659 | 1.29 | 107.8 | 0.342 | 0.938 | 72.5 |

*Equivalent FeS dissolved based on iron analyses.
**Equivalent FeS dissolved based on H$_2$S generated and determined by sulfur analysis.

What is claimed is:

1. A well treatment fluid composition, comprising:
   an acid;
   water;
   an aliphatic aldehyde having 1–10 carbon atoms; and
   an aromatic aldehyde having 9–20 carbon atoms,
   wherein the aromatic aldehyde is a substituted cinnamaldehyde.

2. The composition of claim 1, wherein the weight ratio of aliphatic aldehyde to aromatic aldehyde is from about 2:1 to about 25:1.

3. The composition of claim 1, wherein the weight ratio of aliphatic aldehyde to aromatic aldehyde is about 10:1.

4. The composition of claim 1, wherein the aliphatic aldehyde has 1–6 carbon atoms.

5. The composition of claim 1, wherein the aliphatic aldehyde comprises glyoxylic acid, glyoxal, or a mixture thereof.

6. The composition of claim 1, wherein the aromatic aldehyde has 9–10 carbon atoms.

7. The composition of claim 1, wherein the aromatic aldehyde is primarily t-cinnamaldehyde.

8. The composition of claim 1, wherein the acid is a non-oxidizing mineral acid.

9. The composition of claim 8, wherein the acid is hydrochloric acid, hydrofluoric acid, or a mixture thereof.

10. The composition of claim 1, wherein the acid is a non-oxidizing organic acid.

11. The composition of claim 10, wherein the acid is formic acid, acetic acid, citric acid or a mixture thereof.

12. The composition of claim 1, further comprising one or more additives selected from the group consisting of surfactants, corrosion inhibitors, stabilizers, solvents, reducing agents, sequestering agents, viscosity modifying agents, and pH control agents.

13. The composition of claim 1, wherein the acid is hydrochloric acid, the aliphatic aldehyde comprises glyoxylic acid, glyoxal, or a mixture thereof, and the aromatic aldehyde is primarily t-cinnamaldehyde.

14. The composition of claim 1, further comprising a hydrocarbon and an emulsifying agent.

15. The composition of claim 1, wherein the fluid composition is foamed.

16. The composition of claim 14, wherein the fluid composition is foamed.

17. A corrosion inhibitor composition, comprising:
    an aliphatic aldehyde having 1–10 carbon atoms; and
    an aromatic aldehyde having 9–20 carbon atoms,
    wherein the aromatic aldehyde is a substituted cinnamaldehyde.

18. The composition of claim 17, wherein the weight ratio of aliphatic aldehyde to aromatic aldehyde is from about 2:1 to about 25:1.

19. The composition of claim 17, wherein the weight ratio of aliphatic aldehyde to aromatic aldehyde is from about 10:1.

20. The composition of claim 17, wherein the aliphatic aldehyde has 1–6 carbon atoms.

21. The composition of claim 17, wherein the aliphatic aldehyde comprises glyoxylic acid, glyoxal, or a mixture thereof.

22. The composition of claim 17, wherein the aromatic aldehyde has 9–10 carbon atoms.

23. The composition of claim 17, wherein the aromatic aldehyde is primarily t-cinnamaldehyde.

24. The composition of claim 17, further comprising one or more additives selected from the group consisting of surfactants, corrosion inhibitors, stabilizers, solvents, reducing agents, sequestering agents, viscosity modifying agents, and pH control agents.

25. The composition of claim 17, wherein the aliphatic aldehyde comprises glyoxylic acid, glyoxal, or a mixture thereof, and the aromatic aldehyde is primarily t-cinnamaldehyde.

26. The composition of claim 17, further comprising a hydrocarbon and an emulsifying agent.

27. The composition of claim 17, wherein the fluid composition is foamed.

28. The composition of claim 26, wherein the fluid composition is foamed.

* * * * *